United States Patent [19]

Bucalo et al.

[11] Patent Number: 5,444,778
[45] Date of Patent: Aug. 22, 1995

[54] APPARATUS INCORPORATING A CELLULAR TELEPHONE

[76] Inventors: Louis R. Bucalo, 2167 North Point, San Francisco, Calif. 94123; Brian D. Bucalo, 1010 S. Ocean Blvd., Pompano, Fla. 33062; Peter M. Kash, 60 W. 57th St., New York, N.Y. 10019

[21] Appl. No.: 83,062

[22] Filed: Jun. 25, 1993

[51] Int. Cl.⁶ ............................................. H04M 1/00
[52] U.S. Cl. ................... 379/453; 379/428; 379/437; 379/438
[58] Field of Search ............... 379/426, 449, 451, 455, 379/428, 453, 437, 438; 455/89, 90

[56] References Cited

U.S. PATENT DOCUMENTS 3,723,876  3/1973  Seaborn, Jr. ........................ 455/90
4,677,654  6/1987  Lagin et al. ........................ 455/89
4,868,862  9/1989  Ryoichi et al. ..................... 455/90

Primary Examiner—James L. Dwyer
Assistant Examiner—Jack Chiang
Attorney, Agent, or Firm—Steinberg, Raskin & Davidson

[57] ABSTRACT

Cellular telephone apparatus comprise a portable carrying case, such as a conventional attache case to provide the utility of a business briefcase, a cellular telephone base unit situated within an interior space of the carrying case, an antenna coupled to the base unit, a hand-held receiver, and either a cable or radio link coupling the base unit and hand-held receiver with each other so that the receiver is positionable during use at a position which is spaced away from the antenna which is situated at the carrying case. High frequency, electromagnetic radiation emitted from the antenna is substantially attenuated by the time it reaches the user of the cellular telephone.

12 Claims, 3 Drawing Sheets

APPARATUS INCORPORATING A CELLULAR TELEPHONE

BACKGROUND OF THE INVENTION

This invention relates generally to cellular telephone apparatus and, more particularly, to cellular telephone apparatus which reduces the intensity of electromagnetic radiation to which a user of the apparatus is exposed.

Recently, concerns have been expressed regarding the use of hand-held portable cellular telephones. In particular, it has been alleged that high frequency long-range electromagnetic radiation emitted from the antenna of cellular telephones may cause cancer. Due to the close proximity of the cellular telephone circuitry and antenna to the head of the user during operation of the telephone, the intensity of the electromagnetic radiation to which the user's head is exposed is quite high. For this reason individuals are refraining from using hand-held cellular telephones. In contrast, low power emissions from home cordless phones have not been linked to health problems.

In an effort to reduce exposure to electromagnetic radiation from cellular telephones, various shielding devices have been developed which deflect radiation emissions from the cellular telephone to a direction away from the user's body. However, these shielding devices have several drawbacks. For example, such shielding devices are not entirely effective in protecting the cellular telephone user from electromagnetic radiation emissions at close range since a certain degree of leakage generally occurs even from a shielded antenna. Attempts have also been made to provide shielding devices which direct the electromagnetic radiation emissions from a non-directional antenna to a desired direction away from the user's head. However, such devices generally adversely affect the performance of the cellular telephone due to the resulting highly directional nature of the electromagnetic radiation.

SUMMARY OF THE INVENTION

Accordingly, an object of the present invention is to provide new and improved cellular telephone apparatus.

Another object of the invention is to provide new and improved cellular telephone apparatus which reduces the intensity of the cellular telephone electromagnetic radiation to which the user is exposed.

Still another object of the present invention is to provide new and improved cellular telephone apparatus in which the intensity of the cellular telephone electromagnetic radiation to which the user is exposed is substantially reduced, and wherein the cellular telephone apparatus is easily manageable and not cumbersome in use.

In addition, an object of the present invention is to provide a cellular telephone apparatus for business and other use which does not require additional separate portable objects beyond a standard type briefcase.

A further object of the present invention is to provide new and improved cellular telephone apparatus which reduces the intensity of cellular telephone electromagnetic radiation to which the user is exposed, and wherein the performance of the cellular telephone is not adversely affected.

Briefly, in accordance with the present invention, these and other objects are attained by providing cellular telephone apparatus including a portable carrying case having an openable and closable interior space and a cellular telephone base unit including electrical circuitry for the cellular telephone and a power source, and wherein the cellular telephone base unit is contained within an interior space of the carrying case which may comprise the interior of the case itself or a compartment formed within the walls of the carrying case. The antenna of the cellular telephone apparatus is coupled to the circuitry of the base unit, and may be of several forms including flip-up, fixed, extendable, telescoping or metal rim. The antenna may extend through the wall of the carrying case. A hand-held receiver unit for On-Off, speaking, listening, dialing, and other user functions is coupled to the circuitry of the base unit either by an elongated flexible cable or by a low power radio link similar to that used in home cordless phones. According to the invention, the flexible cable or radio link are sufficiently long such that during use the receiver unit may be situated at a location relatively remote from the carrying case containing the base unit and cellular antenna which emit potentially harmful cellular telephone electromagnetic radiation.

Thus, the present invention is based on the principle that the intensity of electromagnetic radiation emitted from the cellular telephone antenna is substantially attenuated as it travels through the air. In particular, the intensity of electromagnetic radiation emitted from a cellular telephone antenna decreases in proportion to the inverse square of the distance from the source of the electromagnetic radiation, i.e. the circuitry/antenna.

The flexible cable may be wound around a spring loaded reel placed within the interior space or wall of the carrying case to facilitate paying out of the cable during use, and storage of the cable subsequent to use.

When not in use, the receiver unit and cellular antenna are situated within the interior of the carrying case. The receiver unit is accessible through an opening in the wall of the carrying case with the carrying case closed and positioned to lie either flat or upright. The flexible cable passes through the opening in the wall of the carrying case to permit a user to operate the receiver unit without having to open the carrying case.

The cellular telephone antenna is telescopable or otherwise extendable through the wall of the carrying case so as to be visible to the user when the carrying case is closed and positioned flat or upright. The antenna may also be permanently fixed to the case exterior or interior in an identifiable location so as to be separated from the receiver unit when in use.

DESCRIPTION OF THE DRAWINGS

A more complete appreciation of the present invention and many of the attendant advantages thereof will be understood by reference to the following detailed description when considered in connection with the accompanying drawings, in which.

DETAILED DESCRIPTION OF THE PREFERRED EMBODIMENTS

Figure 1:
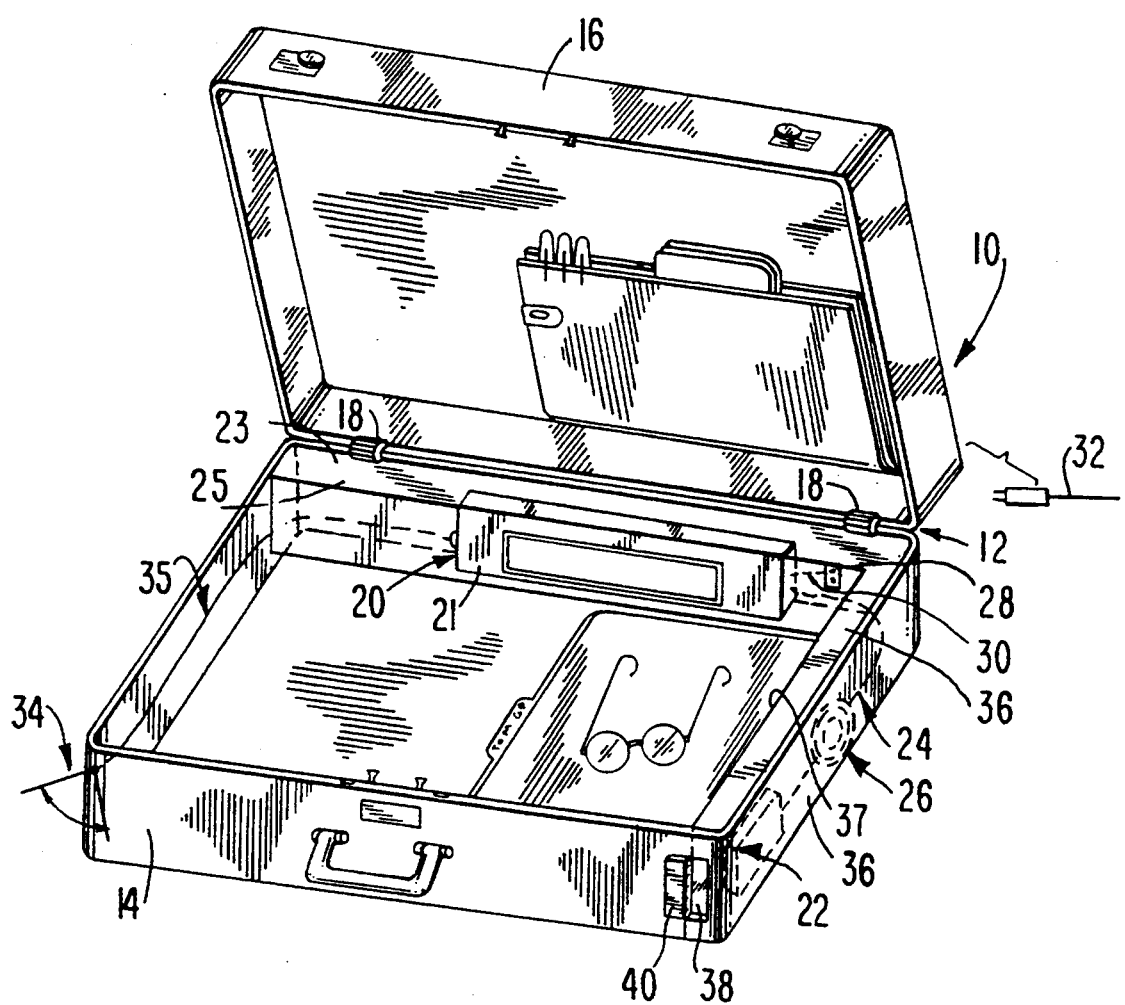
FIG. 1 is a perspective view of a first embodiment of cellular telephone apparatus in accordance with the invention.

Referring to the drawings wherein like reference characters designate identical or corresponding parts throughout the several views and more particularly to FIG. 1, cellular telephone apparatus according to a first embodiment of the invention, generally designated 10, comprises a portable carrying case 12 including a bottom case member 14 and a top cover member 16 connected to the case member 14 by means of hinges 18 and a cellular telephone including a base unit 20 having a housing 21 and a hand-held receiver 22 connected to base unit 20 by means of an elongated flexible cable 24 wound on spring tensioned take-up reel 26. In the illustrated preferred embodiment, the carrying case comprises a conventional business or attache case having an interior defined by the bottom case and top cover members 14, 16.

The base unit 20 is fixed within an interior space of case member 14 of carrying case 12, preferably within a compartment 23 formed in a back wall 25 thereof, and includes within housing 21 cellular telephone circuitry (not shown) and a rechargeable power source (not shown) for operating the circuitry. Power receptacle 28, mounted in the wall of case member 14 is connected via wire 30 to the rechargeable power source (not shown) within base unit 20. One end of a power cord 32 may be connected to power receptacle 28 and the other end of power cord 32 connected to a wall receptacle (not shown) to recharge the power source within base unit 20. Cellular antenna 34 may be on the exterior of case 12 as shown or situated within a wall of case 12 or within the interior of case 12. Wire 35 connects cellular antenna 34 to base unit 20.

The cable 24 has a length preferably in the range of between 3 to 10 feet and most preferably about 4 feet so that the receiver 22 can be situated at a location spaced apart from the location of the carrying case 12 in which the cellular telephone base unit 20 and antenna 34 are situated.

When not in use, the receiver 22 is situated hidden from view within an interior space of carrying case 12 in a compartment 36 formed inside a wall 37, although the interior space may also comprise the interior of the case itself. Alternatively, the receiver 22 may be mounted on an exterior surface of the carrying case 12 whereby the cable 24 passes through an aperture in the carrying case 12. Side wall compartment 36 has an opening 38 which is covered by cover 40. When it is desired to use the cellular phone, cover 40 is opened as shown in FIG. 1 and receiver 22 is lifted through opening 38. As receiver 22 is withdrawn, cable 24 is unwound from spring tensioned take-up reel 26, also situated in compartment 36, and extended 3 to 4 feet away from carrying case 12 containing antenna 34 to the extent permitted by length of cable 24. It is thus not necessary to open carrying case 12 to access receiver 22.

Figure 2:
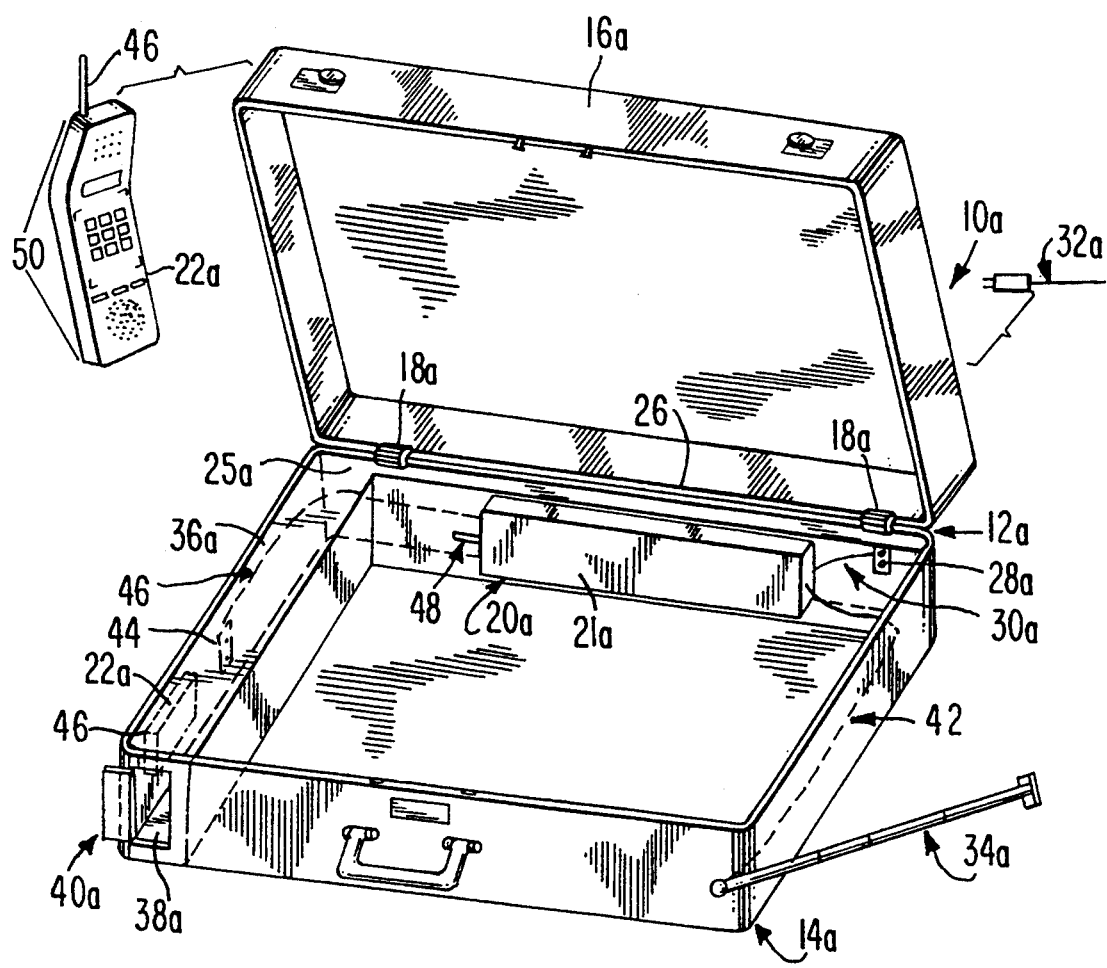
FIG. 2 is a perspective view of a second embodiment of cellular telephone apparatus in accordance with the invention.

Referring now to FIG. 2 wherein elements corresponding to elements described in connection with the FIG. 1 embodiment are designated by the same reference numerals with the suffix "a", cellular telephone apparatus 10a comprises a portable carrying case 12a including bottom case and cover members 14a and 16a pivotally connected to each other by means of hinges 18a. The base unit 20a is fixed within the case member 14a of the carrying case 12a preferably hidden from view within wall compartment 25a so as not to occupy interior space of carrying case 12a. Base unit 20a includes housing 21a, cellular telephone circuitry (not shown) and a rechargeable power source (not shown).

Power receptacle 28a mounted in the wall of case member 14a is connected by wire 30a to the rechargeable power source within base unit 20a. One end of power cord 32a may be connected to power receptacle 28a and the other end of power cord 32a to a wall receptacle (not shown) to recharge the power source within case unit 20a.

Cellular antenna 34a, mounted on the end of carrying case 12a may be of a fixed, flip-up, extendable or telescoping variety, and is connected to base unit 20a via wire 42. Alternatively, cellular antenna 34a may be fixed within or form an integral part of carrying case 12a as in the form of a metal rim.

When not is use, hand-held receiver unit 22a is situated within the interior space of carrying case 12a in wall compartment 36a. Receiver unit 22a when inside wall compartment 36a makes electrical contact with power jack 44 which is connected to base unit 20a by wires 46. In this manner, the internal rechargeable power source of receiver unit 22a (not shown) is recharged by contact with power jack 44.

When it is desired to use the cellular phone apparatus, cover 40a is lifted open, receiver 22a is grasped and lifted through opening 38a to be separated from carrying case 12a as shown in 50.

Receiver 22a incorporates a cordless phone antenna 46 through which a low power radio link similar to that used in home cordless phone is established with base unit 20a when in use. Base unit 20a incorporates a cordless phone base unit antenna 48 for communication with receiver unit 22a. Base unit antenna 48 may be located on the exterior of carrying case 12a, or within the wall of carrying case 12a or in the interior of carrying case 12a.

The low power home cordless phone radio link is lower in energy than that emitted by cellular antenna 34a and has not been associated with adverse health effects. The cordless phone radio link is effective for communication only over very short distances typically measured in feet. The cellular telephone antenna 34a with its more penetrating electromagnetic radiation output has a longer communication range typically measured in miles.

Figure 3:
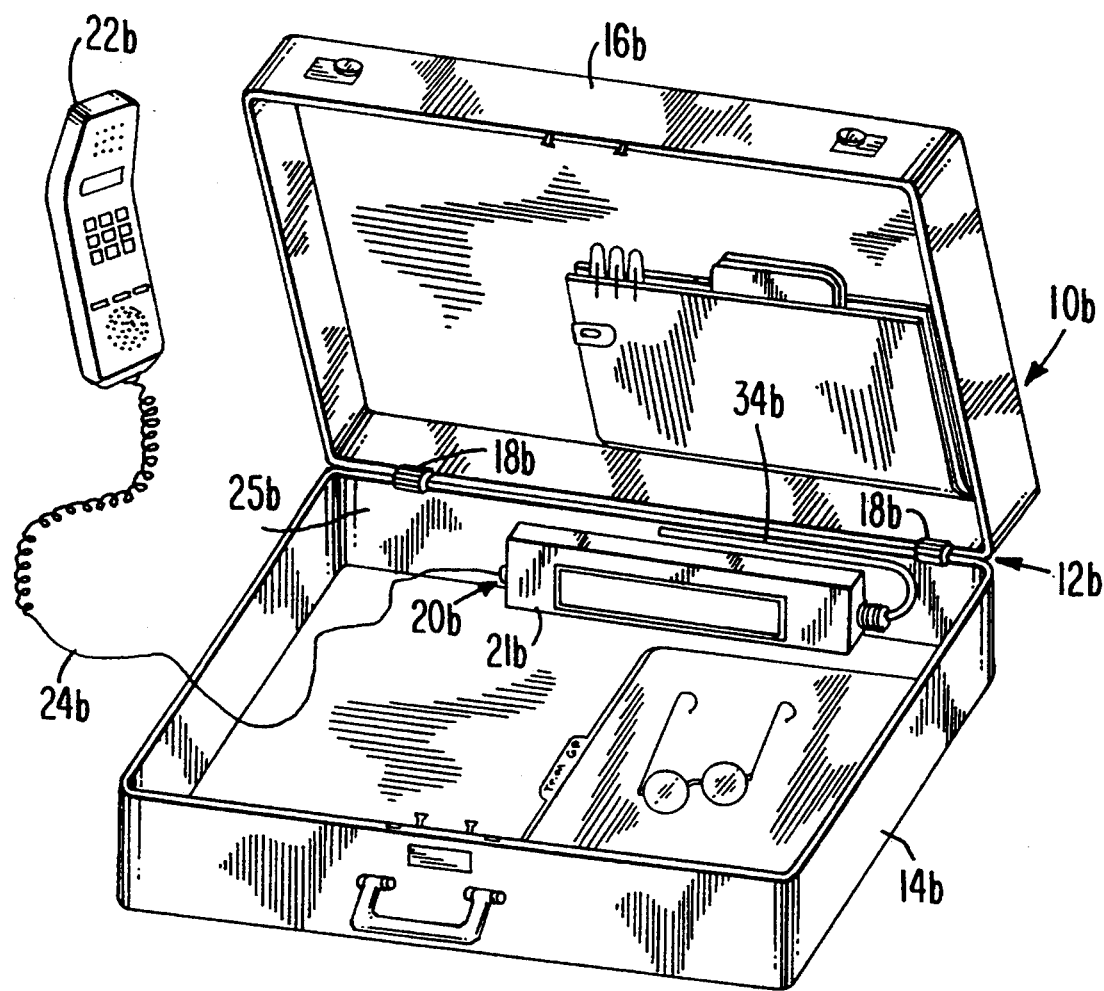
FIG. 3 is a perspective view of a third embodiment of cellular telephone apparatus in accordance with the invention.

Referring to FIG. 3 wherein elements corresponding to elements described in connection with the FIG. 1 embodiment are designated by the same reference numerals with the suffix "b", cellular telephone apparatus according to a third embodiment of the invention, generally designated 10b, comprises a portable carrying case 12b including a bottom case member 14b and a top cover member 16b connected to the case member 14b by means of hinges 18b, and a cellular telephone including a base unit 20b having a housing 21b and a hand-held receiver 22b connected to base unit 20b by means of an elongated flexible cable 24b.

The base unit 20b is fixed within the case member 14b of the carrying case 12b, preferably against the back wall 25b thereof, and includes within housing 21b cellular telephone circuitry (not shown) and a power source (not shown) for operating the circuitry. An antenna 34b is fixed within the carrying case 12b as shown in FIG. 3 or may be located on the cover member 16b, or pass through an opening (not shown) in the wall of bottom case member 14b and be fixed to an exterior surface of the carrying case 12b.

The cable 24b has a length, preferably in the range of between 3 to 15 feet, and most preferably about 4 to 10 feet, so that the receiver 22b can be situated at a location spaced away from the location of the carrying case 12b in which the cellular telephone base unit 20b and antenna 34b are situated. The cable 24b may be loosely situated within the interior of case 12b when not in use.

When not in use, the receiver 22b is situated within an interior space of carrying case 12b comprising the interior defined by case member 14b and cover member 16b in their closed positions. When it is desired to use the cellular telephone, the carrying case 12b is opened by pivoting cover member 16b to its open position shown in FIG. 3, withdrawing the hand-held receiver 22b from the interior of the carrying case, and preferably making the telephone call from a location spaced away, e.g. 4 feet away, from the base unit-containing carrying case 12b to the extent permitted by the length of the cable 24b. In the case where the antenna 34b is situated within the interior space of the carrying case 12b, the latter preferably remains in its open position shown in FIG. 3 during the telephone call to facilitate reception. In the case where the antenna 34b passes through an opening in the side wall of the carrying case, the portable carrying case 12b may remain in its closed position during use of the cellular telephone apparatus.

It is seen from the foregoing that cellular telephone apparatus is provided in which the hand-held receiver can be spaced from the telephone base unit which includes the cellular telephone circuitry and power source, and from the cellular antenna, a distance which is sufficient such that the intensity of the electromagnetic radiation emitted from the cellular antenna is substantially attenuated by virtue of its passage through the air by the time it reaches and is incident upon the user of the telephone. The invention provides all the utilities of a business briefcase in addition to the convenience and safety of cellular telephone apparatus which substantially reduces the intensity of cellular telephone electromagnetic radiation incident on the user and whose operation is not impeded despite the attenuation of the cellular electromagnetic radiation in the direction of the user.

Obviously, numerous modifications and variations of the present invention are possible in the light of the above teachings. It is therefore to be understood that within the scope of the claims appended hereto, the invention may be practiced otherwise then as specifically disclosed herein.

What is claimed is:

1. Cellular telephone apparatus, comprising:
   a portable carrying case including means defining an interior space and means for opening and closing said interior space, said means defining said interior space including a back wall, said interior space of said carrying case encompassing substantially the entire interior of said carrying case, said carrying case having an open position in which said interior space is accessible and a closed position;
   a cellular telephone base unit including cellular telephone circuitry means and a power source for operating said circuitry means, said cellular telephone base unit being situated and fixed against said back wall or within said means defining said interior space such that said cellular telephone base unit does not occupy a significant portion of said interior space;
   antenna means coupled to said base unit at said carrying case;
   a hand-held receiver situated in said interior space of said carrying case, said carrying case including means for enabling removal of said receiver from said carrying case when said carrying case is in said closed position, said enabling means comprising an opening formed in said carrying case communicating between said interior space and an exterior of said carrying case, said receiver being adapted to pass through said opening; and
   means for spacing and coupling said base unit and said hand-held receiver from and into communication with each other through said opening with said receiver removed from said carrying case through said opening and positionable during use spaced away from said antenna means of said carrying case.

2. Cellular telephone apparatus as recited in claim 1 wherein said antenna means are situated within said interior space of said carrying case.

3. Cellular telephone apparatus as recited in claim 1 wherein said antenna means is situated outside of said interior space of said carrying case.

4. Cellular telephone apparatus as recited in claim 1 wherein said antenna means is situated within a wall of said carrying case.

5. Cellular telephone apparatus as recited in claim 1 wherein said portable carrying case comprises a business briefcase thereby providing all the utility of a business briefcase and includes a bottom case member and a cover member hingedly connected to said bottom case member.

6. Cellular telephone apparatus as recited in claim 1 wherein said coupling means comprise an elongate flexible cable having first and second ends, said first end being coupled to said base unit and said second end being connected to said receiver.

7. Cellular telephone apparatus as recited in claim 6 wherein said flexible cable has a length in the range of about between 3 to 10 feet.

8. Cellular telephone apparatus as recited in claim 6 further including a reel device fixed within said carrying case for storing said flexible cable during non-use of said telephone apparatus and for paying out said flexible cable during use.

9. Cellular telephone apparatus as recited in claim 1 wherein said receiver is stored in a compartment formed in a wall of said carrying case.

10. Cellular telephone apparatus as recited in claim 1 wherein said hand-held receiver is situated within said interior space of said portable carrying case during non-use of said telephone apparatus.

11. Apparatus as recited in claim 1 wherein said coupling means comprise a radio link including transmitter and receiver means coupled to said receiver and base unit.

12. Cellular telephone apparatus, comprising:
   a portable carrying case comprising means defining an interior space, said means defining said interior space including a back wall, said carrying case having an open position in which said interior space is exposed and a closed position, said carrying case further comprising an exterior surface having an aperture therein;

a hand-held receiver, said receiver being removable and separable from said carrying case through said aperture in said exterior surface of said carrying case when said carrying case is in said closed position;

a cellular telephone base unit including cellular telephone circuitry means and a power source for operating said circuitry means, said cellular telephone base unit being situated and fixed against said back wall or within said means defining said interior space such that said cellular telephone base unit does not occupy a significant portion of said interior space;

antenna means coupled to said base unit at said carrying case; and means for coupling said base unit and said receiver into communication with each other via said aperture with said receiver removed from said carrying case through said opening and positionable during use spaced away from said antenna means of said carrying case.

* * * * *